United States Patent
Root

(10) Patent No.: US 7,712,710 B2
(45) Date of Patent: May 11, 2010

(54) TELESCOPING STAND WITH PIVOTING HEAD

(75) Inventor: Paul Root, Bad Endbach (DE)

(73) Assignee: Rittal GmbH & Co. KG, Herborn (DE)

( * ) Notice: Subject to any disclaimer, the term of this patent is extended or adjusted under 35 U.S.C. 154(b) by 959 days.

(21) Appl. No.: 10/528,087

(22) PCT Filed: Mar. 24, 2004

(86) PCT No.: PCT/EP2004/003094

§ 371 (c)(1),
(2), (4) Date: Mar. 16, 2005

(87) PCT Pub. No.: WO2004/088196

PCT Pub. Date: Oct. 14, 2004

(65) Prior Publication Data

US 2006/0186284 A1    Aug. 24, 2006

(30) Foreign Application Priority Data

Apr. 4, 2003    (DE) ................................ 103 15 612

(51) Int. Cl.
*A47F 5/00* (2006.01)
(52) U.S. Cl. .................... 248/125.8; 248/161; 248/157; 248/178.1; 403/93
(58) Field of Classification Search ................. 248/161, 248/404, 406.1, 411, 412, 413, 157, 176.1, 248/177.1, 178.1, 179.1, 185.1; 403/93
See application file for complete search history.

(56) References Cited

U.S. PATENT DOCUMENTS

| | | | | |
|---|---|---|---|---|
| 1,007,481 A | * | 10/1911 | Onken ...................... | 248/185.1 |
| 1,371,796 A | * | 3/1921 | Loudon .................... | 248/185.1 |
| 1,397,931 A | * | 11/1921 | Kurtz ........................... | 269/63 |
| 2,051,833 A | * | 8/1936 | Maximilian ................. | 248/371 |
| 2,156,367 A | * | 5/1939 | Zadek ......................... | 403/93 |
| 2,156,489 A | * | 5/1939 | Bonetti ....................... | 248/461 |
| 2,481,717 A | * | 9/1949 | Hosea ..................... | 248/183.2 |
| 2,602,863 A | * | 7/1952 | Raymond et al. .......... | 379/455 |
| 3,128,982 A | * | 4/1964 | Christopher ............. | 248/183.2 |
| 3,690,608 A | | 9/1972 | Poizner | |
| 3,970,274 A | * | 7/1976 | Resk ........................ | 248/185.1 |
| 4,034,946 A | * | 7/1977 | Zimmer, Jr. .............. | 248/183.2 |
| 4,328,943 A | * | 5/1982 | Eldon, III ................... | 248/578 |

(Continued)

FOREIGN PATENT DOCUMENTS

DE    297 17 853 U1    11/1997

(Continued)

*Primary Examiner*—Kimberly T Wood
(74) *Attorney, Agent, or Firm*—Pauley Petersen & Erickson

(57) ABSTRACT

A stand including a column that is mounted on a base section and that has at least one profiled element. A head unit which includes a pivoting element that can be tilted about a horizontal pivoting axis and can be clamped in a desired tilted position is fixed to the upper end section of the column and an upper face of the pivoting element has a receiving element. This invention provides a stable inclined position by a simple manipulation. To achieve this, the head unit includes a bolt which extends into a longitudinal cavity of the profiled element and is fixed relative to the upper end section and in which the pivoting element is mounted.

10 Claims, 4 Drawing Sheets

U.S. PATENT DOCUMENTS

| | | | | |
|---|---|---|---|---|
| 4,770,382 A | * | 9/1988 | Lehti | 248/181.2 |
| 4,790,504 A | * | 12/1988 | Wills et al. | 248/183.2 |
| 5,154,382 A | | 10/1992 | Hoshino | |
| 5,385,323 A | * | 1/1995 | Garelick | 248/161 |
| 6,082,680 A | * | 7/2000 | Woodward et al. | 248/682 |
| 2002/0148940 A1 | | 10/2002 | Lee | |

FOREIGN PATENT DOCUMENTS

| | | |
|---|---|---|
| EP | 0 555 685 A1 | 8/1993 |
| FR | 2 332 449 | 6/1977 |
| GB | 327802 | 4/1930 |
| GB | 2 352 534 A | 1/2001 |

* cited by examiner

TELESCOPING STAND WITH PIVOTING HEAD

BACKGROUND OF THE INVENTION

1. Field of the Invention

This invention relates to a stand with a column, which is placed on a base section and has at least one profiled element, at whose upper end section a heat unit is fastened, which has a pivot element that can be tilted around a horizontal pivot shaft, can be clamped in place in a desired tilt position, and has a receiver element on its top.

2. Discussion of Related Art

Such a stand in the form of a support for holding objects is disclosed by European Patent Reference EP 0 555 685 A1. In connection with this known stand a head unit, which can be tilted around a pivot shaft, is attached to the upper portion of a slim column, wherein a relatively elaborate fastening section overlaps the upper end section of the column.

SUMMARY OF THE INVENTION

It is one object of this invention to provide a stand of the type mentioned above but wherein the head unit is solidly mounted on the column by a simple structure.

This object is attained with a head unit that has a pin, which projects into a longitudinally extending hollow space of the profiled element and which is attached, fixed in place with respect to the upper end section of the profiled element, in which the pivot element is seated.

With this structure the column can be designed solid and the attachment of the head unit is solidly and simply designed. Thus, it is also possible to attach larger device housings to the receiver element, for example.

The steps, wherein the pin has a vertical gap open toward the top, into which the pivot element, which is embodied as a plane-parallel plate, is inserted, contribute to a simple structure with assured functioning and simple handling, wherein the thickness of the pivot element is matched to the clearance of the gap, and the pivot shaft projects through the pin with the pivot element in the area of the gap in the direction of the normal perpendicular line, and the pivot element projects beyond the upper front face of the pin.

Handling and an assured function are enhanced if a clamping bore, which terminates in the gap in the area of the inserted pivot element, is cut parallel with respect to the pivot shaft into the gap area of the pin, and a clamping bolt of a manually adjustable clamping lever with a screw thread is guided transversely through the profiled element which is screwed into a screw thread cut into the profiled element, or a separate screw piece, and can be clamped in place with a front face against the pivot element for fixing a desired inclination of the receiver element.

Further steps for simple, solid mounting are advantageous if a flange-like or ring-shaped fastening element is fixed to the upper front face or the lateral end area of the pin, which projects laterally beyond the pin in the manner of a collar, and by which the pin can be fastened on the upper front face of the profiled element.

The fastening element can be welded or screwed to the profiled element, wherein screw channels which extend longitudinally inside the hollow space of the profiled element are provided for screwing.

Mounting, along with a solid construction are also enhanced if the threaded piece is inserted into a longitudinally extending receiving groove cut into the hollow chamber of the profiled element.

If the column has an outer profiled section attached to the base section, and an inner profiled section seated in a telescopically displaceable manner in it and fixable in several positions, and if the profiled element is formed by the inner profiled section, it is easy to employ different inner profiled sections with different head sections attached to them for different uses. Further simple mounting options thus result.

Sections of the inner contours of the outer profiled section can be matched in cross section to the outer contours of inner profiled sections which have different cross-sectional shapes, so that the different inner profiled sections having respectively three outer contour sections which are spaced apart in the circumferential direction, are supported, non-tiltable in the transverse direction, flat over the length, on at least three inner contour sections which are offset with respect to each other.

BRIEF DESCRIPTION OF THE DRAWINGS

This invention is explained in greater detail in view of exemplary embodiments shown in the drawings, wherein.

DESCRIPTION OF PREFERRED EMBODIMENTS

Figure 1:
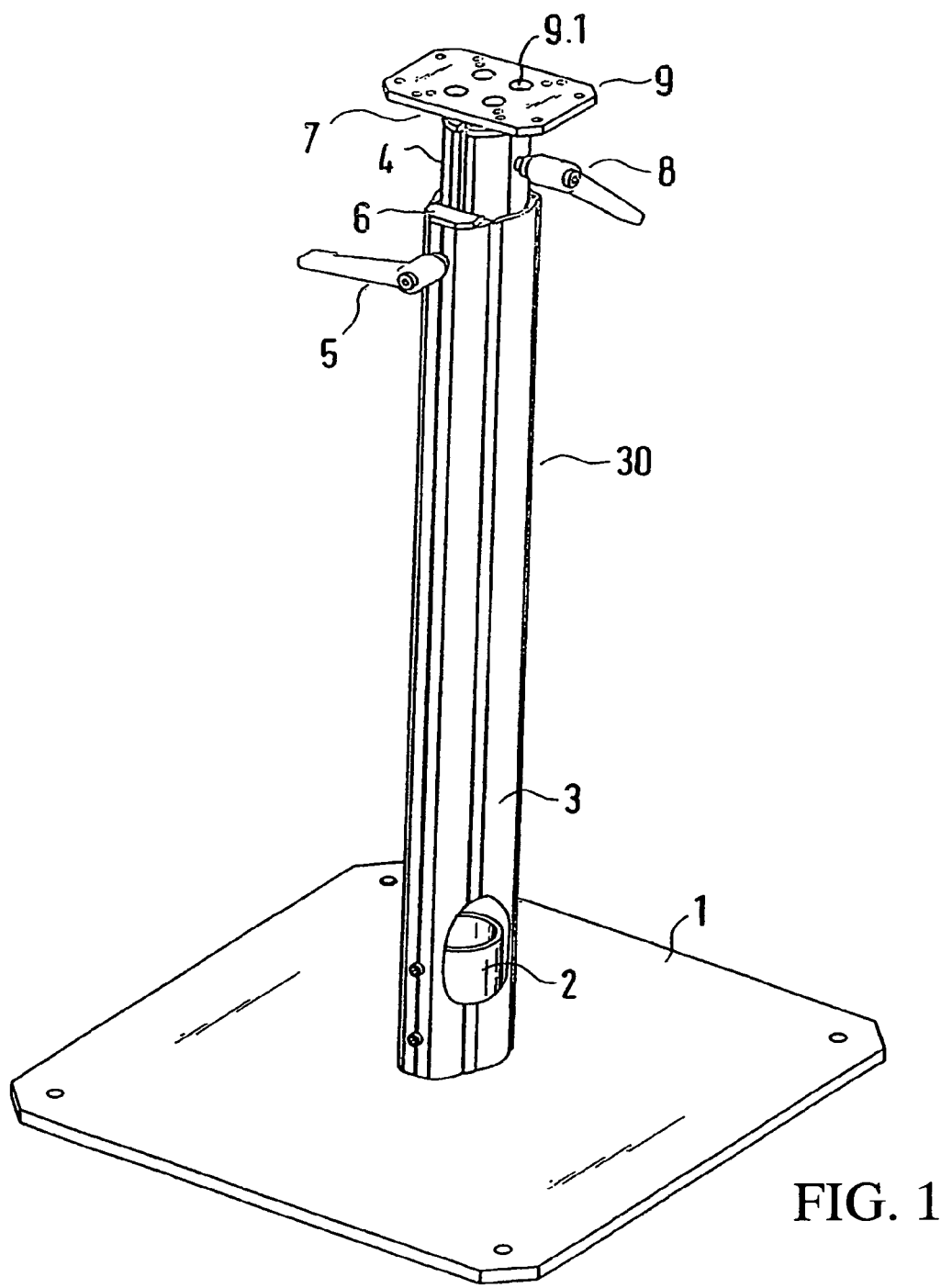
FIG. 1 shows a stand with a height-adjustable column in a perspective view.

A height-adjustable stand represented in FIG. 1 has a flat, one-piece base plate 1 with a vertical support 2 attached centrally to it, on which an outer profiled section 3, whose inner cross-section is matched to the support 2, is fastened. The outer profiled section 3 is a component of a height-adjustable column 30, which has an inner profiled section 4 as a further component, which is inserted into the outer profiled section 3 and can be height-adjusted therein in a telescope-like manner. The inner profiled section 4 has a head element 7, which is attached to an upper end area and has a plate-shaped receiver element 9, which can be tilted around a horizontal axis. The inner profiled section 4 can be continuously height-adjusted inside the outer profiled section 3 and can be fixed in place at a desired height by a clamping mechanism having a manually actuable clamping lever 5 and a clamping element which can be displaced by the clamping lever 5 transversely in relation to the longitudinal axis. For fixing the receiver element 9 in place in a desired tilted position, there is a further clamping lever 8. The plate-shaped receiver element 9 has fastening bores 9.1, as well as further fastening bores for attaching a device housing or a deposit plate.

Figure 2A:
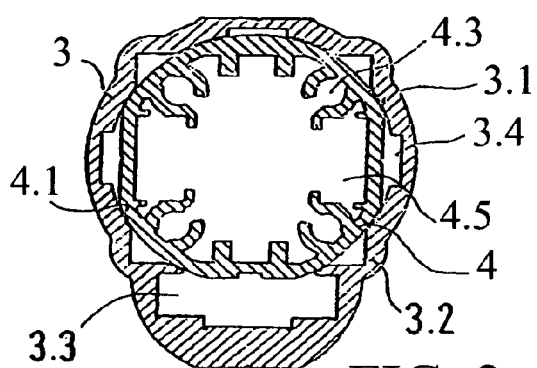
FIGS. 2a to 2c show cross-sectional views of the column in accordance with FIG. 1 with identical outer profiled sections and different inner profiled sections.
Figure 2B:
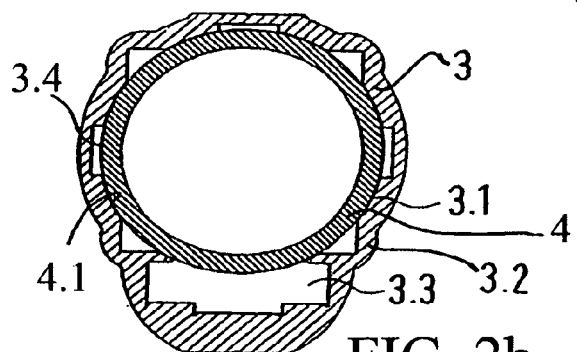
Figure 2C:
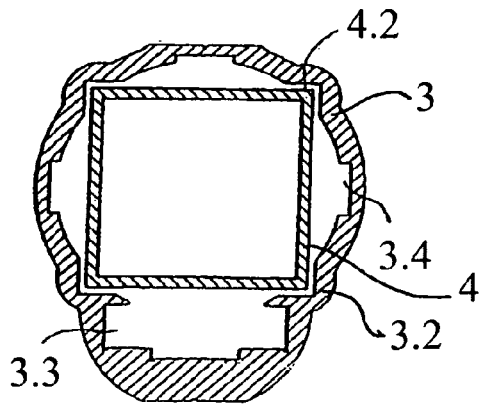

As shown in FIGS. 2a, 2b and 2c, the outer profiled section 3 has inner contour sections 3.1, 3.2 of different cross sections, which are matched in sections to different outer contour sections 4.1, 4.2 of different inner profiled section 4 and support the inner profiled section 4 laterally on at least three sides so that the inner profiled section 4 is guided, non-tiltable and steady, in the longitudinal direction, during which, viewed in a longitudinal direction, plane-like guide sections result from the inner contour sections 3.1, 3.2 and the complementary outer contour sections 4.1, 4.2, because the cross section of the outer profiled section remains the same over its length.

Figure 4:
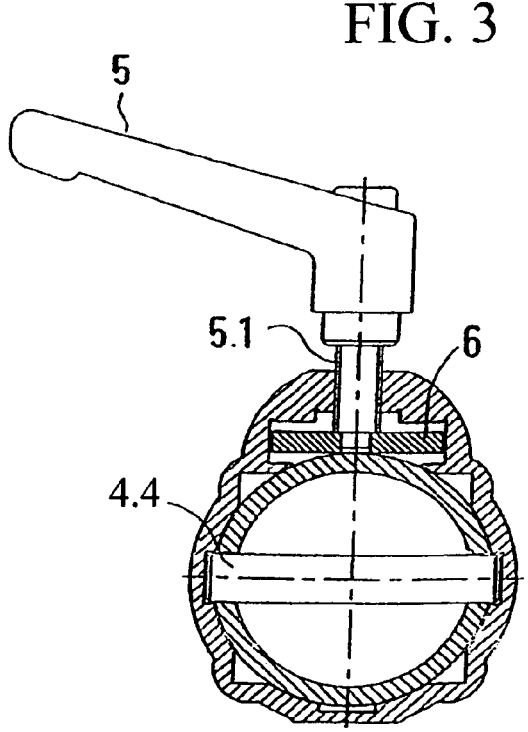
FIG. 4 shows the clamping area of the column, in a cross section view.

In the exemplary embodiment in accordance with FIG. 2a, the inner contour of the outer profiled section 3 has rounded inner contour sections 3.1, as well as angular inner contour sections 3.2, wherein the rounded inner contour sections 3.1 are located, spaced apart from each other, on a circular path and enclose, on several sides, an inner profiled section 4, substantially circular in cross section, having rounded outer contour sections 4.1, which are connected with each other and are located on a corresponding circular path, so that an all-around tilt-preventing support of the inner profiled section 4 inside the outer profiled section 3 results. For example, four larger and four smaller inner contour sections 3.1 exist, which are distributed around the inner profiled section 4 over more than 180°, for assuring the tilt-preventing support. The inner profiled section 4 is flattened only on two oppositely located long sides and has in its interior longitudinally extending screw channels 4.3 for mounting a mounting element of the head element 7 on the front face. In this embodiment, the inner profiled section 4 can be rotated around the vertical, or linearly extending axis in the outer profiled section 3. If rotation around the vertical axis is to be avoided, it is possible such as shown in FIG. 4, for a transverse pin 4.4 to be conducted through the inner profiled section 4, which protrudes on both sides past the outside of the inner profiled section 4 and projects into holding grooves 3.4 on both sides, which are formed in the inner contour of the outer profiled section 3.

As FIG. 2b shows, it is also possible to use a simple profiled tube with circular cross section as the inner profiled section 4, whose outer contour sections 4.1 are supported, safe against tilting and slidingly, in a corresponding manner by the rounded inner contour sections 3.1, the same as the inner profiled section 4 in accordance with FIG. 2a. Here, too, as in connection with FIG. 4, a rotation prevention can be provided by a transverse pin 4.4 as in the exemplary embodiment in accordance with FIG. 2a.

In the exemplary embodiment in accordance with FIG. 2c, a substantially square inner profiled section 4 is inserted into an outer profiled section 3, wherein four angular inner contour sections 3.2, formed in the inner contour of the outer profiled section 3, are used for the tilt-preventing, slidingly guided seating of the inner profiled section 4, including the corner areas of the inner profiled section 4. It is similarly possible to form different angular inner contour sections in the outer profiled section 3 in order to receive an inner profiled section 4 in a guided manner which, for example, has a rectangular, triangular or otherwise polygonal cross section.

The rounded inner contour sections do not have to be embodied in the shape of a section of a circle and to lie on a circular path, but instead they can be matched to an inner profiled section which is oval in cross section, for example.

Figure 3:
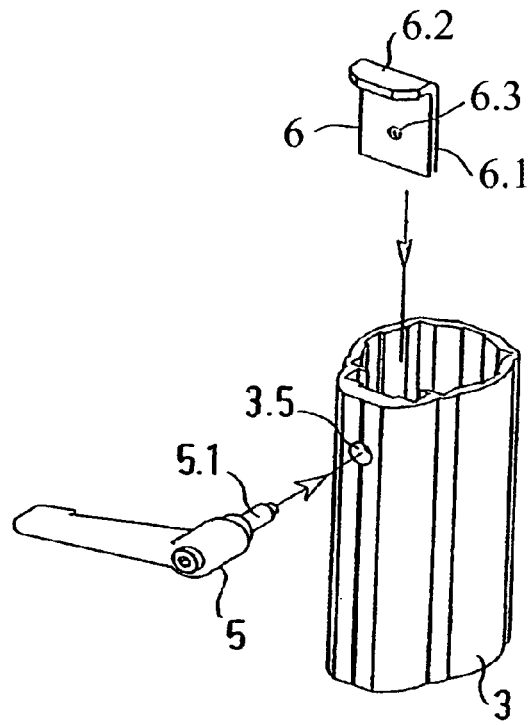
FIG. 3 shows a clamping area of the column, wherein the clamping elements are disassembled, in a perspective view.

As FIGS. 3 and 4, also in connection with FIGS. 2a to 2c show, a preferably T-shaped clamping groove 3.3 with an opening located toward the interior, into which the clamping element 6 of the clamping mechanism is inserted for fixing the inner profiled section 4 at a desired height position, is formed in the inner contour of the outer profiled section 3. The clamping element 6 rests with a clamping plate section 6.1 in the clamping groove 3.3 and is maintained, secure against sliding in the clamping groove 3.3, on the upper front face of the outer profiled section 3 by an outwardly extending holding protrusion 6.2. In the area of the clamping plate section 6.1, namely in a holding bore 6.3 of the clamping element 6 cut there, a transversely extending threaded bore 3.5 is cut into the outer profiled section 3, into which a threaded pin 5.1 of the clamping lever 5 is screwed and projects with an end section of reduced diameter into the holding bore 6.3, and rests with a flange-like shoulder of the threaded pin 5.1 on the exterior of the clamping plate section 6.1 so that, when the threaded pin 5.1 is screwed in, the clamping element 6 is displaced inward and clamps the inner profiled section 4 in place in the outer profiled section 3.

Figure 5:
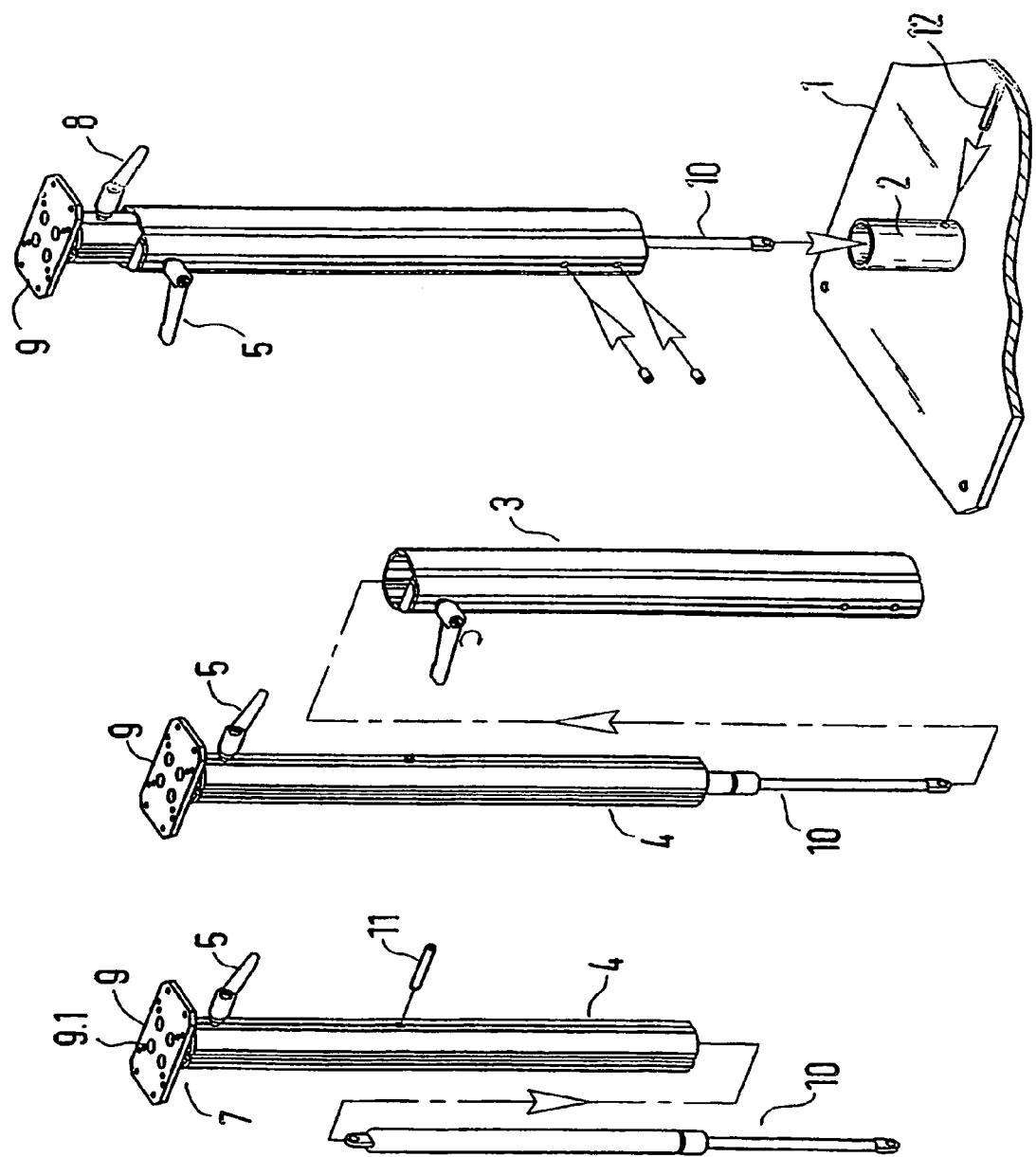
FIG. 5 shows a perspective view of the column with a gas spring in a partially disassembled state.

With the construction shown in FIG. 5, the inner profiled section 4 is supported by a gas spring 10 on the base section, so that lifting the inner profiled section 4 with the receiver element 9 and an object or device located thereon is easily possible. The gas spring 10 is fixed in place in the hollow inner profiled section 4 by at least one fastening bolt 11, and on the other side by at least one fastening bolt 12 in the hollow support 2, which results in a simple assembly. The outer profiled section 3, which is supported with its lower end on the base plate 1, can be simply fixed in place on the support 2 by fastening bolts or screws.

Figure 6:
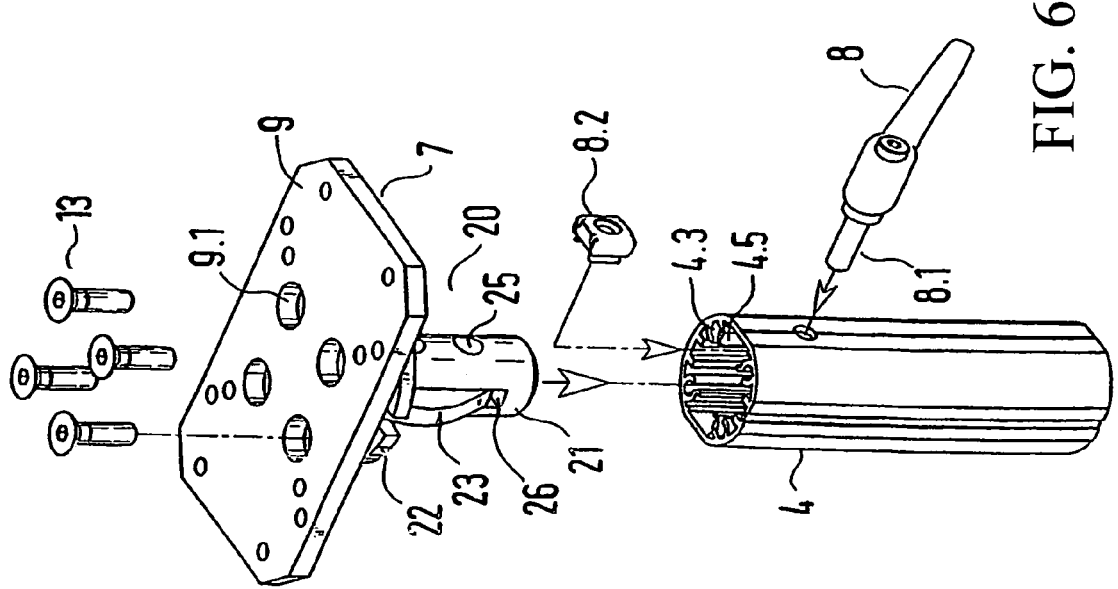
FIG. 6 shows an area of a head unit in the removed state, in a perspective view.

FIG. 6 shows the upper portion of the inner profiled section 4 with the head element, or the head unit 7, which can be inserted therein, in more detail, wherein the head unit 7 is removed. The head unit 7 has an adjusting unit 20 for adjusting the inclination of the receiver unit 9 which, for example, is plate-shaped. The adjusting unit 20 has a vertical pin 21 arranged underneath the receiver unit 9, which is inserted, with as little play as possible, into the inner hollow chamber of the inner profiled section 4, wherein inwardly protruding holding ribs, which are supported on the exterior circumference of the pin 21, are arranged in the inner hollow chamber of the inner profiled section 4. The screw channels 4.3, which terminate in the upper end, are also cut into the hollow chamber of the interior profiled section 4. Furthermore, at least one receiving groove 4.5 extending in the linear direction for inserting a threaded piece 8.2 in the form of a cage nut is formed in the hollow chamber of the interior profiled section 4.

Figure 7:
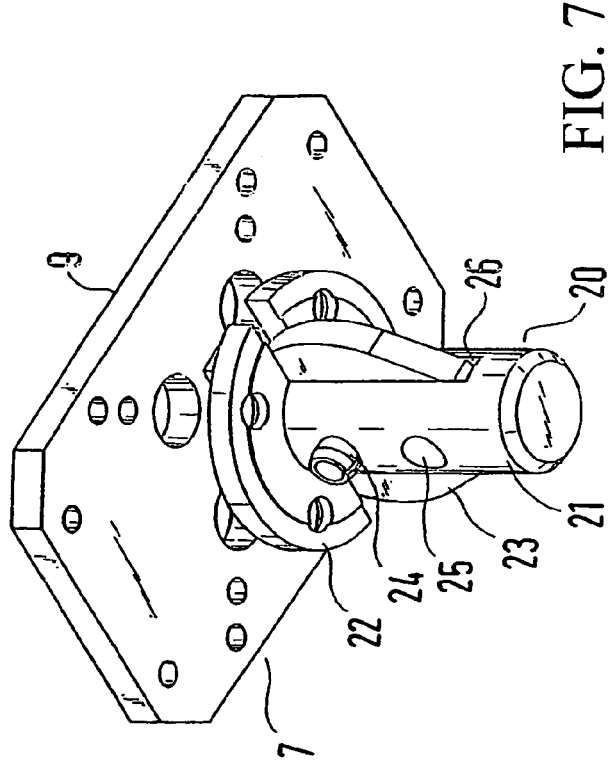
FIG. 7 shows another perspective view of the head unit in accordance with FIG. 6.

As shown in particular in FIG. 7, the pin 21 which is cylinder-shaped, for example, has a gap 26, open to the top, in its diameter area, into which a pivot element 23, embodied as a plane-parallel plate, is inserted, pivotable around a horizontal pivot shaft 24. The thickness of the pivot element 23 is matched to the clearance of the gap 26, bordered by also plane-parallel lateral faces, so that the pivot element 23 can be pivoted easily and free of play. The pivot shaft 24 is passed through the pin 21 and the pivot element 23 in the direction of the normal perpendicular line with respect to the plate-shaped pivot element 23. The pivot element 23 protrudes upward beyond the pin 21 and supports on its top the receiver element 9 fastened on it, so that the receiver element 9 can be tilted along with the pivot element 23.

Also, a clamping bore 25 is cut, parallel with the pivot shaft 24, in the pin 21 in the area of the plate-shaped pivot element 23, into which projects a clamping bolt 8.1 of the clamping lever 8, wherein the clamping bolt 8.1, which has a screw thread, that can be displaced in the threaded piece 8.2 inserted into the receiving groove 4.5 so far that with its front face it can be clamped in place on the pivot element 23 for fixing in a desired tilt position. From this results a simple, secure clamping mechanism for fixing the pivot element 23 and also the receiver element 9, in place in the desired inclined position.

The head element, or the head unit 7, is fastened by a fastening piece 22 on the front of the inner profiled section 4, for example by screws or by welding. Thus the fastening piece 22 is plate-shaped or ring-shaped and is attached in the upper end area, or on the front of the pin 21, and projects beyond the latter on the circumferential side. For being screwed in, the fastening piece 22 has holes which correspond to the screw channels 4.3, so that it can be rigidly connected with the inner profiled section 4 by screws which can be inserted into the screw channels 4.3. Further fastening screws 13 are provided for attaching a deposit plate or device housing to the receiver element 9 in the fastening bores 9.1, or further fastening bores.

The invention claimed is:

1. A stand with a column (30) placed on a base section (1, 2) and having at least one profiled element (4) with an upper end section fastened to a head unit (7) which has a pivot element (23) that can be tilted around a horizontal pivot shaft (24), can be clamped in place in a desired tilt position, and that has a receiver element (9) on a top, the stand comprising:

the head unit (7) having a pin (21) projecting into a longitudinally extending hollow space of the profiled element (4) and which is fixedly attached with respect to the upper end section of the profiled element in which the pivot element (23) is seated, the pin (21) having a vertical gap (26) open toward a top, into which the pivot element (23) embodied as a plane-parallel plate is inserted, a thickness of the pivot element (23) being matched to a clearance of the gap (26), and the pivot shaft (24) projecting through the pin (21) with the pivot element (23) near the gap (26) in a direction of a normal perpendicular line, and the pivot element (23) projecting beyond an upper front face of the pin (21);

wherein a clamping bore (25) terminates in the gap (26) near the inserted pivot element (23) and is cut parallel with respect to the pivot shaft (24) into the gap area of the pin (21), and a clamping bolt (8.1) of a manually adjustable clamping lever (8) with a screw thread is guided transversely through the profiled element (4) screwed into a screw thread which is cut into one of the profiled element and a separate threaded piece (8.2), and is clamped in place with a front face against the pivot element (23) for fixing a desired inclination of the receiver element (9).

2. The stand in accordance with claim 1, wherein a fastening element (22) is fixed to the pin (21) which projects laterally beyond the pin (21) and by which the pin (21) is fastenable on an upper front face of the profiled element (4).

3. The stand in accordance with claim 2, wherein the fastening element (22) is one of welded and screwed to the profiled element (4), and screw channels (4.3) extend longitudinally inside a hollow space of the profiled element (4).

4. The stand in accordance with claim 3, wherein the threaded piece (8.2) is inserted into a longitudinally extending receiving groove (4.5) cut into the hollow space of the profiled element (4).

5. The stand in accordance with claim 4, wherein the column (30) has an outer profiled section (3) attached to the base section (1,2), and an inner profiled section (4) is seated in a telescopically displaceable manner and can be fixed in place in several positions, and the inner profiled section (4) forms the profiled element.

6. The stand in accordance with claim 5, wherein sections of inner contours of the outer profiled section (3) are matched in cross section to outer contours of inner profiled sections (4) but have different cross-sectional shapes.

7. The stand in accordance with claim 1, wherein the threaded piece (8.2) is inserted into a longitudinally extending receiving groove (4.5) cut into the hollow space of the profiled element (4).

8. The stand in accordance with claim 1, wherein the column (30) has an outer profiled section (3) attached to the base section (1,2), and an inner profiled section (4) is seated in a telescopically displaceable manner and can be fixed in place in several positions, and the inner profiled section (4) forming the profiled element.

9. The stand in accordance with claim 8, wherein sections of inner contours of the outer profiled section (3) are matched in cross section to outer contours of inner profiled sections (4) but have different cross-sectional shapes.

10. A stand with a column (30) placed on a base section (1, 2) and having at least one profiled element (4) with an upper end section fastened to a head unit (7) which has a pivot element (23) that can be tilted around a horizontal pivot shaft (24), can be clamped in place in a desired tilt position, and that has a receiver element (9) on a top, the stand comprising: the head unit (7) having a pin (21) projecting into a longitudinally extending hollow space of the profiled element (4), the head unit fixedly attached with respect to the upper end section of the profiled element in which the pivot element (23) is seated, the head unit including flange-shaped or a ring-shaped fastening element (22) fixed to one of an upper front face or a lateral end area of the pin (21), projecting laterally beyond the pin (21) as a collar and by which the head unit (7) is fastenable on the upper end section of the profiled element (4), by fastening screws into screw channels (4.3) extending longitudinally inside a hollow space of the profiled element (4).

* * * * *